United States Patent [19]

Roberts et al.

[11] 4,427,107

[45] Jan. 24, 1984

[54] BELTING

[75] Inventors: Michael J. Roberts, Little Weighton; Keith Saul, Hedon, both of England

[73] Assignee: J. H. Fenner & Co. Ltd., North Humberside, England

[21] Appl. No.: 148,831

[22] Filed: May 12, 1980

[30] Foreign Application Priority Data

May 19, 1979 [GB] United Kingdom ............... 7917516

[51] Int. Cl.³ .................................... B65G 15/30
[52] U.S. Cl. ................................ 198/844; 28/141; 156/304.3; 156/304.5; 198/847; 428/58; 428/60; 428/225; 428/229; 428/246; 428/253; 428/257
[58] Field of Search ............... 428/192, 193, 57, 58, 428/59, 60, 61, 62, 63, 224, 225, 253, 257, 258, 229; 28/141; 156/304.5, 304.3, 159; 198/844, 847

[56] References Cited

U.S. PATENT DOCUMENTS

| 3,135,642 | 6/1964 | Ruffer | 428/57 |
| 3,481,807 | 12/1969 | Konamori | 428/57 |
| 3,664,907 | 5/1972 | Price | 428/57 |

FOREIGN PATENT DOCUMENTS 1563703  3/1980  United Kingdom .

Primary Examiner—James J. Bell
Attorney, Agent, or Firm—Gipple & Hale

[57] ABSTRACT

The life of a joint in splice jointed conveyor belting is increased by providing a belting wherein the joint is protected by a covering of a breaker fabric having substantially different stretch characteristics in warp and weft directions. A suitable breaker fabric is a warp knitted fabric having a warp to weft elongation ratio of from 1:2 to 1:30, preferably 1:3 to 1:20, for example approximately 1:15. The conveyor belting may comprise a solid woven textile fabric core impregnated and/or coated with polyvinyl chloride and the joint may be one formed by finger splicing.

24 Claims, 5 Drawing Figures

BELTING

This invention relates to belting, particularly conveyor belting, although it may also be applied to other forms of belting, such as power transmission belting.

Conveyor belting usually comprises a textile fabric core or carcass impregnated and/or coated with a polymeric material such as pvc (polyvinyl chloride). The textile core may be of plied construction and comprise a series of plies woven separately and then stitched or otherwise joined together subsequent to weaving. Alternatively, the textile core may be of solid woven construction and comprise a multiple ply textile fabric in which the various plies are held together by binding threads, the whole fabric being produced in one weaving operation.

In use, conveyor belting is formed into an endless belt by joining the ends of the belting together either by metallic fasteners or by splicing. The present invention is concerned with splice-jointed belting and especially with the fabric used to form the so-called "breaker fabric" which envelopes and binds the belting in the region of the splice.

The two basic methods of splicing are "finger splicing", examples of which are to be found in U.K. Patent Specification Nos. 705,303; 858,403; 901,197; 917,260; 977,226; 1,057,402; 1,058,463 and 1,079,136; and "overlap splicing", examples of which are to be found in U.K. Patent Specification Nos. 451,331 and 459,331. Finger splicing is particularly suitable for splicing belting formed from solid woven carcasses and overlap splicing is more appropriate for plied construction belting. The present invention is primarily concerned with finger splicing, but could be employed with advantage for overlap splicing or for any splicing method where the use of a breaker fabric is, or could be, involved.

For a proper understanding of the invention, it is necessary to appreciate the function of the breaker fabric and the important contribution that this makes in protecting the splice and thereby extending the life of the joint. It is found in practice that once the breaker fabric has been torn off or so badly damaged that it is no longer able to fulfill its purpose, then splice failure follows in a relatively short space of time. The reason for this is that the forces induced in the belt, due to flexion and centrifugal force, as it passes round rollers, tends to cause the leading edge of the splice to lift. Once the leading edge, or tips of the fingers, stand off of the belt, further damage and subsequent failure follow fairly quickly due to repeated impact with scraper bars or similar belt cleaning devices. This is probably the most common mode of failure of spliced joints and it is therefore desirable to provide a breaker fabric which is itself better resistant to damage.

The breaker fabric is subject to the same bending and centrifugal forces as the splice and in similar manner, the leading edge starts to lift and the whole fabric is rapidly peeled back due to repeated contact with scraper bars.

SUMMARY OF THE INVENTION

An object of the invention is to provide an improved splice joint wherein the area in the region of the splice is enveloped and protected by a breaker fabric having improved resistance to flexion forces and better resistance to impact damage, due to contact with scraper bars.

According to the present invention, there is provided a splice-jointed belting wherein the joint is protected by a covering of a breaker fabric having substantially different stretch characteristics in warp and weft directions. A suitable fabric having the requisite characteristics is a warp knitted fabric having a warp to weft elongation ratio of from 1:2 to 1:30, preferably 1:3 to 1:20, for example approximately 1:15. Corresponding terms applied to warp knitted fabric are wales and courses which respectively have the same meaning as the terms warp and weft.

The invention also includes a method of protecting a splice joint in belting which comprises applying to the joint a covering of a breaker fabric having the above different stretch characteristics. Both in the belting and in the method, the breaker fabric should be placed in position on the splice joint so that the warp threads of the fabric lie in the transverse plane of the belt and the weft threads lie in its longitudinal plane, whereby the low elongation warp serves to hold the splice firmly in place while the fabric is able to flex freely around pulleys, due to its high weft stretch being in the longitudinal direction of the belting.

A further advantage of the invention is that the weft threads are so weak that the fabric does not peel back when the leading edge is damaged and the remaining warp threads away from the leading edge remain firmly in place.

Usually, in spliced joints, a polymer provides the necessary adhesion between the mating surfaces of the joint. Polyurethane is a preferred polymer which is used to form the splice and also preferably to impregnate and finally coat the breaker fabric, but other polymers known for this purpose, such as polyvinyl chloride or butadiene/acrylonitrile co-polymer, may equally well be used in the practice of the present invention.

The invention will be further described by way of example with reference to the accompanying drawings, in which:

DETAILED DESCRIPTION OF THE DRAWINGS

Figure 1:
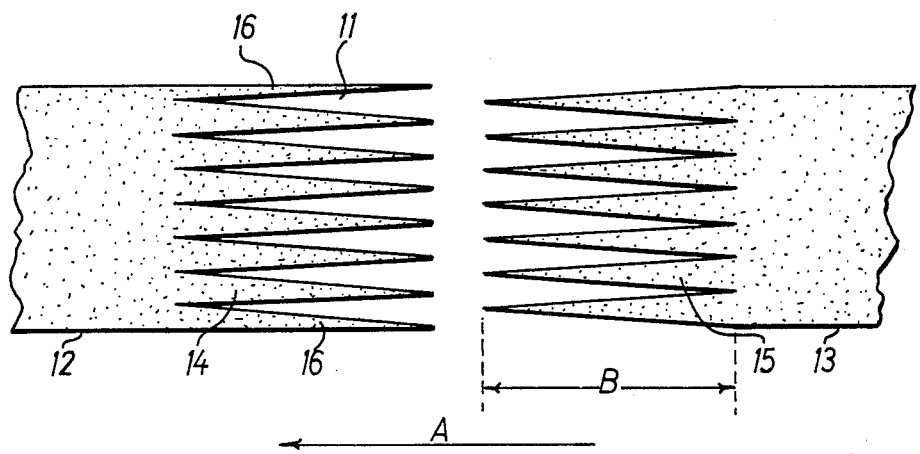
FIG. 1 is a plan view of a pair of belt ends to be joined by splicing in which complementary fingers have been formed.

Referring to FIG. 1, complementary V-notches 11 are cut in the end portions 12, 13 of a conveyor belt which are to be joined by splicing. The length of the resulting fingers 14,15 is preferably between 60 and 100 cms with a maximum width of 5 cms at the base and 5 cm spacing at the tips although these dimensions may be varied according to the width and thickness of the belt, typical belt widths being 40 to 140 cms. To obtain satisfactory finger tips, these are located approximately 7.5 cms inwardly of the transverse edges of the original belt ends. The fingers should be cut so that those which are outermost (16) can point in the opposite direction to that in which the belt is to travel. The direction of belt travel is indicated by arrow A; the finger length by B.

Also required are an electrically heated vulcanising press, a corresponding mold for the belt ends, a breaker fabric having differential warp and weft stretch characteristics and polyurethane jointing or splicing paste, which may be flame resistant. Such jointing paste is commercially available and comprises a prepolymer and curative which are not mixed until required for use.

The pvc belting covers are removed from the fingers to expose the textile carcass fully using first an electric planing machine and then a powered wire brush. The edges of the fingers are roughened with a rasp. Dirt is then removed from the pvc surfaces in the region of the intended joint with trichloroethylene, taking care to avoid contact between this solvent and the textile carcass. The fingers are then dried by placing both ends of the belt in the press for 30 minutes at 145°±5° C.

Figure 2:
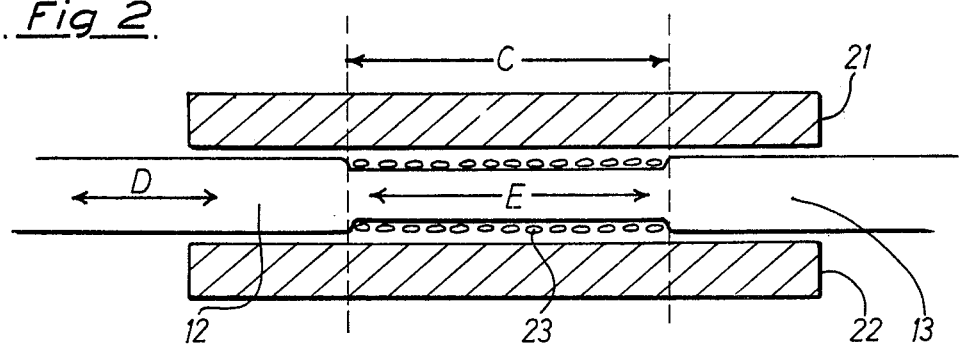
FIG. 2 is a longitudinal vertical section through a belt joint in a press.

In FIG. 2, the ends of the belt 12, 13 are shown between the platens 21, 22 of the press. The splice area is indicated by C and the position of the breaker fabric in the gap formed by removing the belting covers from the fingers by 23. The direction of the belt warp is indicated by the double arrow D. It should be noted that the warp direction of the belt is not the same as the warp direction of the breaker fabric, the high elongation (weft) direction of which has been indicated by the double arrow E. Double arrows D and E having the same meaning as in FIG. 2 are also shown in FIGS. 3 and 4.

Figure 3:
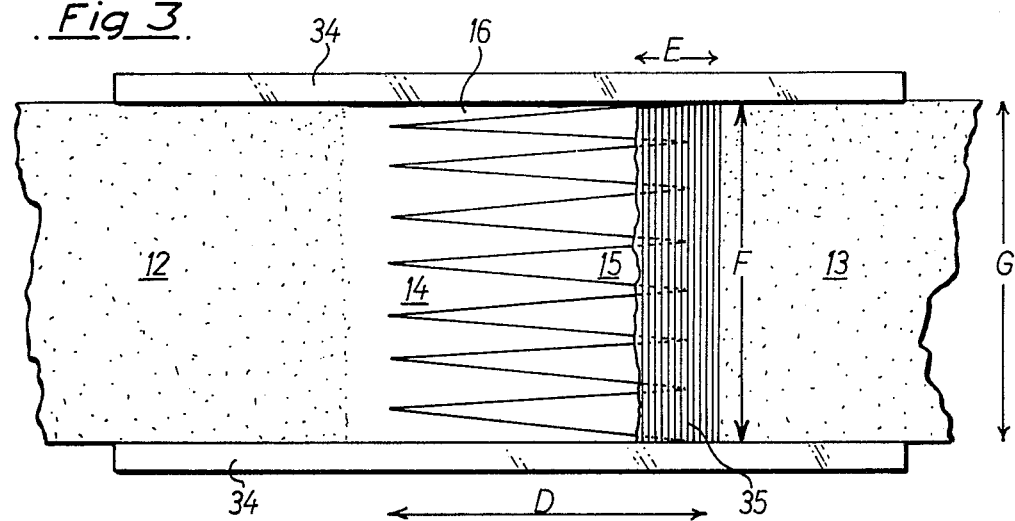
FIG. 3 is a plan view of the belt joint in a mold.
Figure 4:
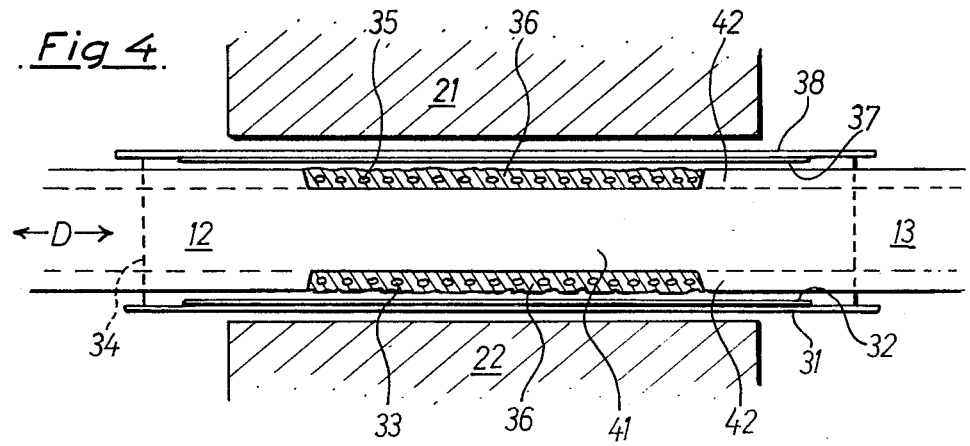
FIG. 4 is a longitudinal vertical section through the belt joint in the mold.

Referring to FIGS. 3 and 4, the bottom mold plate 31 is located on the bottom platen 22 of the press and covered with silicone (release) paper 32. The two ends 12,13 of the belt to be joined are clamped on the mold plate 31 with the fingers 14,15 of the two ends interlocked to leave a gap between the fingers of approximately 0.75 mm. The belt ends are so clamped that the fingers of each end can be turned back to expose the silicone paper lining 32, which is then covered with a layer of the pre-mixed polyurethane paste of an extent sufficient subsequently to cover the gap between the fingers. A sheet of breaker fabric 33 is then placed on the polyurethane layer with the low elongation threads laid in the transverse plane of the belt as indicated by the double arrow F and covered with a further layer of the polyurethane paste whereby the fabric is fully impregnated with the paste. (The double arrow G indicates the belt weft). The fingers of the belt ends are then interlocked again on top of the breaker fabric and pressed into the paste. Edge bars 34 form the sides of the mold and prevent outflow of the paste from the sides of the belt. The top of the splice area is covered with more paste which is worked into the gap between the fingers. A further sheet of breaker fabric 35 is positioned on top of the splice area with the same warp-weft orientation as the lower layer and the edges of the lower sheet of breaker fabric are folded over the edges of the top sheet. A further layer of paste is coated onto the breaker fabric whereby the fabric is fully impregnated. In FIG. 4, the paste is numbered 36. The breaker fabric completely covers the joint and extends slightly beyond the extremities of the fingers. The whole of the top of the splice area is covered with a layer of silicone treated paper 37 which is pressed onto the splice. The mole is then closed by the top mold plate 38. Also in FIG. 4, the belt carcass is numbered 41 and the belt outer covers 42.

The top platen of the press 21 is applied to the top of the mold. The pressure applied by the press is between 1.75 and 3.5 kg/cm². The press is heated to the curing temperature of the polyurethane and this temperature is maintained for a sufficient time to complete the vulcanising of the joint, after which the press is kept closed until the temperature falls below 70° C. The belt joint is then removed from the press and the flash trimmed from the edges of the splice.

Figure 5:
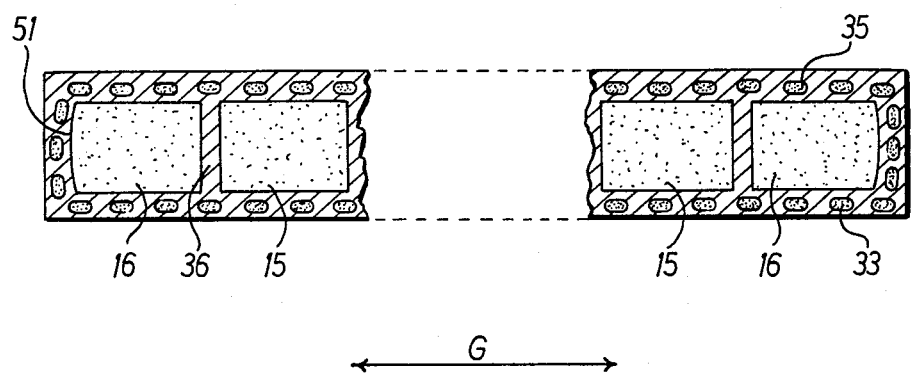
FIG. 5 is transverse vertical section through the finished belt joint.

In FIG. 5, the numeral 51 designates the belt selvedge. The symbols 15, 16, 33, 35, 36 and G have the same meaning as in the previous figures. For simplicity in FIG. 5, the breaker fabric 33, 35 is represented by its high elongation yarns whereas in FIG. 4, the breaker fabric 33, 35 is represented by its low elongation yarns.

It will be appreciated that the dimensions of the breaker fabric will be so chosen in relation to the length of the splice fingers and the width of the belt that the whole of the region of the splice-joint is adequately covered by the breaker fabric.

We claim:

1. A splice-jointed belting comprising belting including a spliced joint and a protective covering comprising a knitted breaker fabric completely covering the joint, the breaker fabric having substantially different stretch characteristics in the directions of the wales and courses, said breaker fabric being positioned on the spliced joint so that the thread in the direction of the wales of the breaker fabric lies in the transverse plane of the belting and the thread in the direction of the courses of the breaker fabric lies in the longitudinal plane of the belting whereby the low elongation wales serve to hold the spliced joint firmly in place while the breaker fabric is able to flex freely in the longitudinal direction of the belting due to the high courses elongation of the breaker fabric.

2. Belting as claimed in claim 1 wherein the knitted fabric is a warp knitted fabric having a wales to courses direction elongation ratio of from 1:2 to 1:30.

3. Belting as claimed in claim 2 wherein the wales to courses direction elongation ratio is from 1:3 to 1:20.

4. Belting as claimed in claim 1 in the form of conveyor belting comprising a textile fabric impregnated with a polymeric material.

5. Belting as claimed in claim 4 wherein the polymeric material is polyvinyl chloride.

6. Belting as claimed in claim 4 wherein the textile is of solid woven construction comprising a plurality of textile fabric plies in which said plies are held together by binding threads, the whole textile having been produced in one weaving operation.

7. Belting as claimed in claim 6 wherein the spliced joint is formed by finger splicing.

8. Belting as claimed in claim 1 wherein a polymer provides adhesion between the mating surfaces of the joint.

9. Belting as claimed in claim 8 wherein the polymer also impregnates the breaker fabric.

10. Belting as claimed in claim 8 wherein the polymer is a polyurethane.

11. A splice-jointed belting comprising belting including a spliced joint and a protective covering of a knitted breaker fabric completely covering the joint, the breaker fabric being positioned on the spliced joint so that thread in the direction of the wales of the breaker fabric lies in the transverse plane of the belting and thread in the direction of the courses of the breaker fabric lies in the longtitudinal plane of the belting, said breaker fabric being a warp knitted fabric having a wales to courses direction elongation ratio of from 1:2 to 1:30.

12. A method of protecting a splice joint in belting which comprises the steps of completely covering the joint with a knitted breaker fabric, the fabric having substantially different stretch characteristics in the directions of the wales and courses; positioning the fabric on the splice joint so that the thread in the direction of the wales of the breaker fabric lies in the transverse plane of the belting and the thread in the direction of the courses of the breaker fabric lies in the longitudinal plane of the belting whereby the low elongation wales serve to hold the splice firmly in place while the breaker fabric is able to flex freely in the longitudinal direction of the belting due to the high elongation of the courses of the breaker fabric and completely covering the joint with said applied positioned breaker fabric.

13. A method as claimed in claim 12 wherein the knitted fabric is a warp knitted fabric having a wales to courses direction elongation ratio of from 1:2 to 1:30.

14. A method as claimed in claim 13 wherein the wales to courses direction elongation ratio is from 1:3 to 1:20.

15. A method as claimed in claim 12 wherein the belting is conveyor belting comprising a textile fabric impregnated with an elastomeric material.

16. A method as claimed in claim 15 wherein the polymeric material is polyvinyl chloride.

17. A method as claimed in claim 15 wherein the textile fabric is of solid woven construction comprising a a plurality of textile fabric plies in which said plies are held together by binding threads, the whole textile fabric being produced in one weaving operation.

18. A method as claimed in claim 17 wherein the joint is formed by finger splicing.

19. A method as claimed in claim 12 wherein a polymer provides adhesion between the mating surfaces of the joint.

20. A method as claimed in claim 19 wherein the breaker fabric is impregnated with the polymer.

21. A method as claimed in claim 19 wherein the polymer is a polyurethane.

22. A method as claimed in claim 12 wherein the belting is conveyor belting comprising a textile fabric coated with an elastomeric material.

23. A method as claimed in claim 12 wherein the belting is conveyor belting comprising a textile fabric impregnated with an elastomeric material.

24. A method of protecting a spliced joint in belting which comprises the steps of (a) applying a covering comprising a knitted breaker fabric having a wales to courses direction elongation ratio of from 1:2 to 1:30 to the joint; and (b) positioning said breaker fabric on the spliced joint so that thread in the direction of the wales of the breaker fabric lies in the transverse plane of the belting and thread in the direction of the courses of the breaker fabric lies in the longitudinal plane of the belting.

* * * * *